US008265812B2

(12) United States Patent
Pease

(10) Patent No.: US 8,265,812 B2
(45) Date of Patent: Sep. 11, 2012

(54) SYSTEM AND METHOD FOR A MARINE VESSEL AUTOPILOT

(76) Inventor: William M Pease, Weston, MA (US)

( * ) Notice: Subject to any disclaimer, the term of this patent is extended or adjusted under 35 U.S.C. 154(b) by 0 days.

(21) Appl. No.: 13/295,899

(22) Filed: Nov. 14, 2011

(65) Prior Publication Data

US 2012/0130570 A1     May 24, 2012

Related U.S. Application Data

(60) Provisional application No. 61/416,871, filed on Nov. 24, 2010.

(51) Int. Cl.
*G05D 1/00* (2006.01)
*G06F 7/00* (2006.01)
*G05D 1/08* (2006.01)

(52) U.S. Cl. ............... 701/21; 701/3; 701/4; 701/10; 701/14

(58) Field of Classification Search .................. None
See application file for complete search history.

(56) References Cited

U.S. PATENT DOCUMENTS

| 3,741,474 | A | | 6/1973 | Kawada et al. |
| 4,074,648 | A | | 2/1978 | Reid et al. |
| 4,140,075 | A | | 2/1979 | Berkhan |
| 4,253,149 | A | | 2/1981 | Cunningham et al. |
| 4,383,259 | A | | 5/1983 | Radar |
| 4,428,052 | A | * | 1/1984 | Robinson et al. ............ 701/117 |
| 4,590,570 | A | | 5/1986 | Rader |
| 4,692,868 | A | | 9/1987 | Wesner et al. |
| 4,811,679 | A | | 3/1989 | Masuzawa et al. |
| 5,179,905 | A | * | 1/1993 | Hossfield et al. ......... 114/144 E |
| 5,523,951 | A | | 6/1996 | Kriesgman et al. |
| 5,884,213 | A | | 3/1999 | Carlson |
| 5,934,406 | A | | 8/1999 | Dvorak et al. |
| 5,983,145 | A | * | 11/1999 | Becker ............................ 701/21 |
| 6,273,771 | B1 | | 8/2001 | Buckley et al. |
| 6,470,246 | B1 | * | 10/2002 | Crane et al. ..................... 701/21 |
| 6,611,737 | B1 | | 8/2003 | El-Tahan et al. |
| 6,687,579 | B2 | | 2/2004 | Thompson et al. |
| 6,995,527 | B2 | | 2/2006 | DePasqua |
| 7,305,928 | B2 | | 12/2007 | Bradley et al. |
| 2002/0007231 | A1 | * | 1/2002 | Lohmiller .......................... 701/3 |
| 2003/0191561 | A1 | * | 10/2003 | Vos .................................. 701/3 |
| 2006/0058929 | A1 | | 3/2006 | Fossen et al. |
| 2006/0064211 | A1 | | 3/2006 | Johansen et al. |
| 2006/0111855 | A1 | * | 5/2006 | Johansen et al. ................ 702/67 |

(Continued)

FOREIGN PATENT DOCUMENTS

DE     4110249 A1     10/1992

(Continued)

*Primary Examiner* — Ian Jen
(74) *Attorney, Agent, or Firm* — Aliki K. Collins; AKC Patents LLC

(57) ABSTRACT

An autopilot system includes a navigation application for computing angular position and angular turn rate of a pilot line and an autopilot steering application for calculating steering commands for a ship steering device. The pilot line provides directional guidance to a ship and is a vector having one end attached to a point on the ship and a second end pointing to a desired direction. The autopilot steering application receives the computed pilot line angular position and angular turn rate and calculates angular position steering commands for the steering device. The steering commands are calculated by taking into account the difference between the pilot line angular position and the ship's angular position and the difference between the pilot line angular turn rate and the ship's angular turn rate.

39 Claims, 13 Drawing Sheets

U.S. PATENT DOCUMENTS

| | | |
|---|---|---|
| 2006/0116796 A1 | 6/2006 | Fossen et al. |
| 2007/0100478 A1 | 5/2007 | Egeland et al. |
| 2007/0143090 A1 | 6/2007 | Skjetne et al. |
| 2007/0162207 A1 | 7/2007 | Shimo et al. |
| 2007/0250227 A1 | 10/2007 | Fossen et al. |
| 2009/0222154 A1* | 9/2009 | Lopriore .................. 701/21 |
| 2010/0168942 A1* | 7/2010 | Noffsinger et al. ........... 701/21 |
| 2010/0250035 A1* | 9/2010 | Ito et al. .................. 701/21 |

FOREIGN PATENT DOCUMENTS

| | | |
|---|---|---|
| JP | 1996-119197 A | 5/1996 |
| WO | 0034837 A1 | 6/2000 |
| WO | 0065417 A1 | 11/2000 |
| WO | 02058989 A1 | 8/2002 |
| WO | 02060048 A1 | 8/2002 |
| WO | 2004059411 A1 | 7/2004 |
| WO | 2005077754 A1 | 8/2005 |
| WO | 2005121915 A1 | 12/2005 |
| WO | 2006054898 A1 | 5/2006 |
| WO | 2007053023 A1 | 5/2007 |
| WO | 2007067064 A1 | 6/2007 |

* cited by examiner

SYSTEM AND METHOD FOR A MARINE VESSEL AUTOPILOT

CROSS REFERENCE TO RELATED CO-PENDING APPLICATIONS

This application claims the benefit of U.S. provisional application Ser. No. 61/416,871 filed on Nov. 24, 2010 and entitled SYSTEM AND METHOD FOR A MARINE VESSEL AUTOPILOT which is commonly assigned and the contents of which are expressly incorporated herein by reference.

FIELD OF THE INVENTION

The present invention relates to an improved system and method for a marine vessel autopilot and in particular to a marine vessel autopilot that is based on a novel "pilot-line steering" methodology.

BACKGROUND OF THE INVENTION

Typically a marine vessel is steered via a steering mechanism that drives the ship's steering device, i.e. rudder. A rudder redirects the water past the stern, thereby imparting a turning or yawing motion to the vessel. In small boats, a tiller (i.e., a pole) is attached to the top of the rudder and is used by a helmsman to move the rudder and thereby to steer the boat. In large ships a steering wheel is linked to the rudder via cables, pushrods or hydraulic means. Manual steering of the vessels involves moving the tiller or steering wheel by a helmsman. Automatic steering (or autopilot) involves receiving input from one or more sensors, calculating the required steering movement and driving the steering device according to the calculated movement. Typical sensors include a compass, global position system (GPS) and Speed log (measuring speed of the vessel through the water), among others. An automatic steering system includes computing hardware and software and is used to maintain a chosen course or track line without constant human action.

Currently the majority of marine vessels are capable of being steered both manually and automatically. Manual steering (with the autopilot off) is usually performed by a helmsman at the steering wheel directly controlling the ship's rudder. As the vessel is steered manually by the helmsman, the rudder activity to accomplish maneuvers is usually excessive, even for a highly skilled helmsman. Automatic steering with current autopilot systems on often face the same challenges since present-day autopilots execute some, but not all of maneuvers required in a selected voyage plan. In particular, even with an autopilot system on, all maneuvers are initiated manually.

Accordingly, there is a need for an improved marine vessel autopilot system that reduces excessive rudder activity during steering and is capable of initiating and executing automatically all maneuvers required to complete a selected voyage plan.

SUMMARY OF THE INVENTION

In general, in one aspect the invention features an autopilot system including a navigation application for computing angular position and angular turn rate of a pilot line and an autopilot steering application for calculating steering commands for a ship steering device. The pilot line provides directional guidance to a ship and comprises a vector having one end attached to a point on the ship and a second end pointing to a desired direction. The autopilot steering application receives the computed pilot line angular position and angular turn rate and calculates angular position steering commands for the steering device. The ship steering device steers the ship and is set according to the calculated steering commands to steer the ship so that the ship's velocity vector lines up with the pilot line.

Implementations of this aspect of the invention may include one or more of the following features. The autopilot steering application calculates the steering commands by taking into account the difference between the pilot line angular position and the ship's angular position and the difference between the pilot line angular turn rate and the ship's angular turn rate. The autopilot steering application calculates steering commands according to equation:

$$\text{RudCmd} = K_{max}(P_c - S_c) + K_{vel}(dP_c/dt - dS_c/dt),$$

wherein RudCmd is the steering command;
wherein $P_c$ is the pilot line angular position, and $S_c$ is the ship's angular position;
wherein $dP_c/dt$ is the pilot line angular turn rate, and $dS_c/dt$ is the ship's angular turn rate;
wherein Kmax is a constant having a value equal to the ratio of a maximum steering device angular turn rate to a maximum allowable ship angular turn rate; and
wherein Kvel is a constant having a value that causes the ship's response to a pilot line angular turn rate input to be damped.

The system further includes one or more motion sensors that provide input signals of ship's angular position and turning rate and the autopilot steering application calculates the steering commands for the steering device based on the sensor input signals. All ship maneuvers are accomplished with the ship's angular turn rate being equal or less than a set maximum ship angular turn rate value, and with the steering device angular turn rate being equal or less than a set maximum steering device angular turn rate value. The system further includes a computing system and the computing system includes a computing device, a database, the navigation application, and the autopilot steering application. The ship follows a voyage plan and the voyage plan comprises at least first and second waypoints connected via a track line and the navigation application compares the ship's current position relative to the first and second waypoint positions and determines offset of the ship's current position from the track line, and angular direction of the track line and subsequently uses the determined offset of the ship's current position from the track line, and angular direction of the track line to compute pilot line angular position and angular turn rate. Each navigation maneuver comprises one or more successive segments and the navigation application computes pilot line angular position and pilot line angular turn rate for each segment and provides the computed pilot line angular positions and pilot line angular turn rates to the autopilot steering application for each successive segment. At a transition instant between two adjacent segments the pilot line angular position and angular turn rate are changed and the ship's position, ship's angular turn rate and the steering device's angular position do not change. The one or more motion sensors include one or more of a ship's position sensor, GPS, ship speed sensor, ship angular position sensor, ship angular turn rate sensor, steering device position sensor, compass, or speedlog. The database includes voyage plan information, maximum ship allowable angular turn rate and maximum steering device linear turn rate. The system further includes a command system and the command system includes a command unit and a display. The command unit includes one or more command buttons used to initiate specific maneuvers and the display displays at least a portion of a selected voyage plan, the ship's direction and the pilot line. The pilot line angular position and angular turn rate are computed by taking further into account a bias of the pilot line angular position ($P_c$bias) associated with a change in the pilot line angular turn rate in any of the segments. At the instant of a transition from one segment to the next, the rudder command's response is calculated according to equation:

$$\text{RudCmd}(0+)-\text{RudCmd}(0-)=K_{max}(P_c(0+)-P_c(0-))+K_{vel}(dP_c/dt(0+)-dP_c/dt(0-))$$

(0−) refers to the instant before the transition and (0+) refers to the instant after the transition.

Accompanying a change in the pilot line angular turn rate the pilot line bias has a value equal to:

$$P_c\text{bias}=K_{vel}/K_{max}(dP_c/dt(0+)-dP_c/dt(0-))$$

and the pilot line is then calculated according to equation:

$$P_c(0+)=P_c(0-)-P_c\text{bias}$$

In general, in another aspect, the invention features a method for automatically steering a ship including providing a navigation application for computing angular position and angular turn rate of a pilot line and providing an autopilot steering application for calculating steering commands for a ship steering device. The pilot line provides directional guidance to a ship and comprises a vector having one end attached to a point on the ship and a second end pointing to a desired direction. The autopilot steering application receives the computed pilot line angular position and angular turn rate and calculates angular position steering commands for the steering device. The ship steering device steers the ship and is set according to the calculated steering commands to steer the ship so that the ship's velocity vector lines up with the pilot line.

In general, in another aspect, the invention features a method for automatically steering a ship including selecting a voyage plan, and receiving ship's current position from a position sensor. The voyage plan includes at least first and second waypoints connected by a track line. Next, periodically, comparing ship's current position relative to the first and second waypoint positions, and if there is an offset from the track line, computing angular position and angular turn rate of a pilot line for reducing the offset to zero. The pilot line provides directional guidance to the ship. Next, calculating ship steering commands by taking into account the difference between the pilot line angular position and the ship's angular position and the difference between the pilot line angular turn rate and the ship's angular turn rate and then setting ship's steering device angular position according to the calculated steering commands, thereby adjusting ship's angular position so that its velocity vector lines up with the pilot line.

Implementations of this aspect of the invention may include one or more of the following features. The steering commands are calculated according to equation:

$$\text{RudCmd}=K_{max}(P_c-S_c)+K_{vel}(dP_c/dt-dS_c/dt),$$

wherein RudCmd is the steering command;
wherein $P_c$ is the pilot line angular position, and $S_c$ is the ship's angular position;
wherein $dP_c/dt$ is the pilot line angular turn rate, and $dS_c/dt$ is the ship's angular turn rate;
wherein Kmax is a constant having a value equal to the ratio of a maximum steering device angular turn rate to a maximum allowable ship angular turn rate; and
wherein Kvel is a constant having a value that causes the ship's response to a pilot line angular turn rate input to be damped.

The method further includes introducing a bias in the pilot line angular position associated with a change in the pilot line angular turn rate. Each navigation maneuver includes one or more successive segments and at an instant of a transition from one segment to the next, the rudder command's response is calculated according to equation:

$$\text{RudCmd}(0+)-\text{RudCmd}(0-)=K_{max}(P_c(0+)-P_c(0-))+K_{vel}(dP_c/dt(0+)-dP_c/dt(0-))$$

(0−) refers to the instant before the transition and (0+) refers to the instant after the transition. Accompanying a change in the pilot line angular turn rate, the bias of the pilot line has a value equal to:

$$P_c\text{bias}=K_{vel}/K_{max}(dP_c/dt(0+)-dP_c/dt(0-))$$

and the pilot line is then calculated according to equation:

$$P_c(0+)=P_c(0-)-P_c\text{bias}$$

The calculating of the ship steering commands includes one or more of a settle segment, an approach segment, or a convergence segment. In the settle segment the pilot line first points away from the track line and rotates toward an approach line. In the approach segment the pilot line approaches the desired track line at a constant angle. In the convergence segment the pilot line tip touches and slides along the track line causing the ship to converge asymptotically with the desired track line.

Among the advantages of this invention may be one or more of the following. The marine vessel autopilot system of this invention executes automatically all maneuvers required to complete a selected voyage plan. The autopilot system also aids manual overrides, returns to automatic steering plan when the manual overrides are over, and executes special maneuvers which are usually not part of the selected voyage plan and are initiated by one of the ship's officers. Furthermore, the autopilot system automatically employs adaptive steering in rough seas to reduce rudder activity and to regain lost forward speed. The new autopilot system is turned on for all normal operations, both manual and automatic, and remains on for the entire voyage. In the manual mode, the helmsman steers the vessel with the aid of the computer in the autopilot system. Steering becomes far easier and the resulting rudder action is smooth and minimal. In the automatic mode, a succession of maneuvers is planned for the entire voyage, including course keeping, course changing and track keeping and the maneuvers are then initiated and executed automatically.

Each ship on which the new autopilot system is installed has parameters entered into its autopilot computer, such as speed and steering maneuver limits. The steering maneuver limits, namely maximum rudder rate, and maximum ship allowable turning rate, are entered into the computer and all maneuvers, both manual and automatic, are executed smoothly without exceeding these limits. Accomplishing the smooth execution of a complete voyage plan requires an entirely new method for computing the steering commands that are issued continuously to the rudder servomechanism. This new computing method is called "Pilot-line Steering". The computer computes the direction and rate of turn of a pilot line, one end of which is attached to the ship's turning point. It also computes rudder commands continuously to bring and keep the ship's heading in alignment with the pilot line. At the transition at the end of each segment of each maneuver and the beginning of the next, the computer positions the pilot line so that the rudder will not receive a command for any sudden jumps or rates that exceed the specified maximum rudder rate limit.

The autopilot system receives signals from the ship's motion sensors, including, at least, a compass, a turn rate sensor, a speed log, rudder position sensor and GPS. The autopilot system includes a computer and a steering stand with a wheel, a display and housing for the computer. The autopilot system also includes an autopilot application for calculating and controlling the rudder commands based on the sensor inputs and a navigation application. The navigation application includes one application calculating all various specific maneuvers or a plurality of applications, where each application is designed to calculate specific maneuvers.

The autopilot system of this invention may permit reduced watch keeping personnel and improved piloting. The system also improves the safety of the ship, reduces fuel consumption due to improved navigation and elimination of unnecessary maneuvers, and reduces the wear and tear on the steering device. The autopilot system may provide labor savings due to better navigation scheduling and may reduce insurance costs due to increased safety in the navigation operations.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views.

DETAILED DESCRIPTION OF THE INVENTION

A new marine vessel autopilot system is described that executes automatically all maneuvers in a selected voyage plan.

Figure 1:
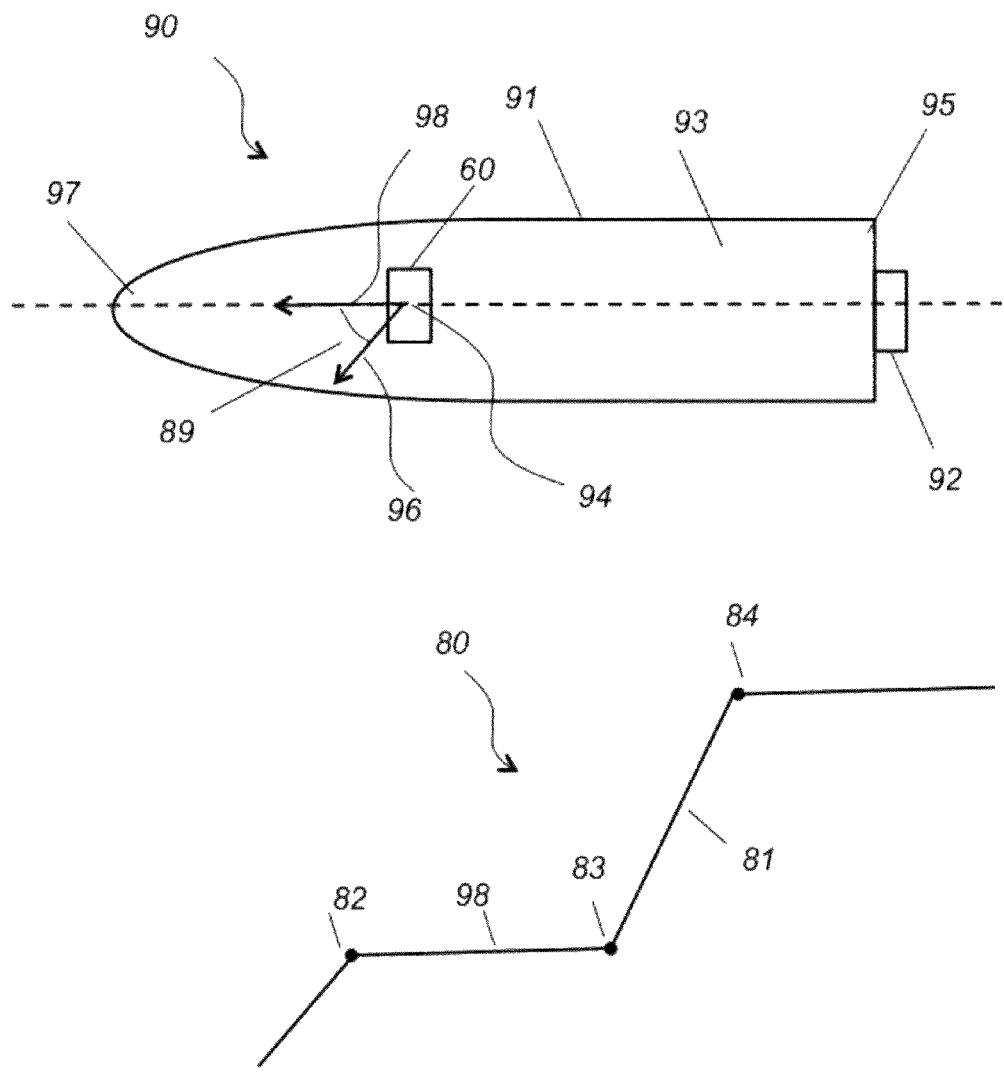
FIG. 1 is a schematic top view of a ship and a schematic view of a voyage plan.

Referring to FIG. 1, a ship 90 includes a hull 91 having a deck 93 at the top, a bow 97 (front) and a stern 95 (back). The ship 90 is shown moving along track line direction 98. A steering device or rudder 92 is attached to the stern 95 and is used to steer the ship. A steering system 60 transfers steering commands to the rudder servomechanism in order to rotate the vessel 90 around the turning point 94 by an angle 89 and thereby to change the current ship's direction 98 toward the direction of a pilot line 96 in order to approach a new track line 81 as part of a voyage plan 80. Voyage plan 80 includes track lines 98, and 81 and one or more waypoints 82, 83 and 84.

Figure 2:
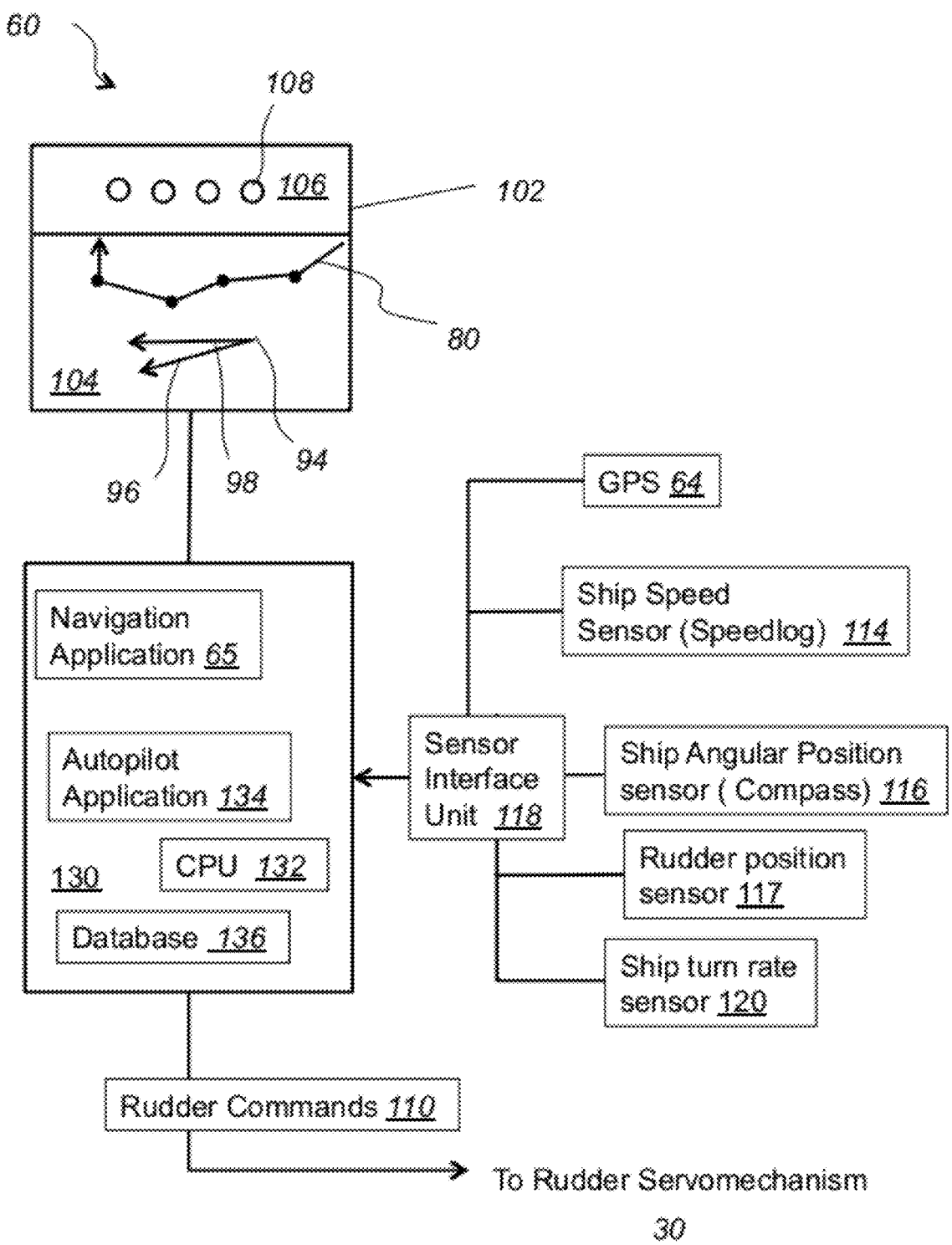
FIG. 2 is an overview block diagram of the pilot line based autopilot system of this invention.

Referring to FIG. 2, the steering system 60 of this invention includes a computing system 130 and a navigation command unit 102. The computing system 130 includes a central processing unit (CPU) 132, a navigation application 65, an autopilot application 134 and a database 136. The CPU 132 has the capability of a conventional desktop PC and processes the navigation and autopilot applications. The computer's clock serves as the navigation clock so that the navigation and autopilot applications are precisely synchronized. The autopilot application 134 provides the instructions for calculating the rudder commands 110 based on the "pilot-line" steering methodology of the present invention, as will be described below. The autopilot application 134 calculates the rudder commands 110 for all various specific maneuvers required in a voyage plan. The CPU 132 calculates the rudder commands 110 based on the autopilot application 134 instructions and based on input from the ship's motion sensors and the pilot-line parameters. The ship's motion sensors provide the ship's position and velocity and include a GPS 112, ship velocity sensor 114, ship angular position sensor 116, rudder position sensor 117, ship turn rate sensor 120, compass, speedlog, among others. Database 136 includes voyage plan 80 information, ship dimensions, ship constants, maximum ship turn rate, and maximum rudder turn rate, among others. The command unit 102 includes a display 104 and command center 106. Display 104 displays at least a portion of the chosen voyage plan 80, the ship's current direction 98 and the pilot line vector 96. The command center 106 includes directional command buttons 108 that are used to initiate specific maneuvers that are not part of the voyage plan 80.

Figure 3:
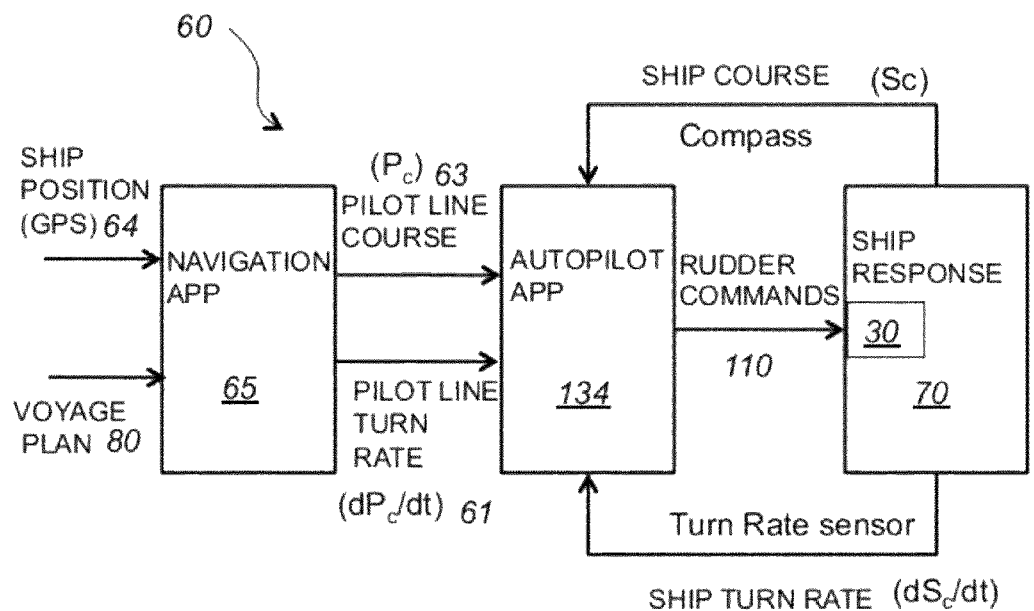
FIG. 3 is a schematic view of the pilot line based steering system of this invention.

Referring to FIG. 3, the navigation application 65 receives inputs including a waypoint defined voyage plan 80 and the current ship's position coordinates 64 periodically throughout the entire voyage plan 80. Each voyage plan 80 includes a series of consecutive waypoints (i.e., 82, 83) stored in the database 136. The line between two consecutive waypoints is defined as a track line. As was mentioned above, the waypoint defined voyage plans 80 are stored in a database 136 and the ship's current position coordinates 64 are provided periodically from a GPS receiver 64, as shown in FIG. 2.

Figure 4:
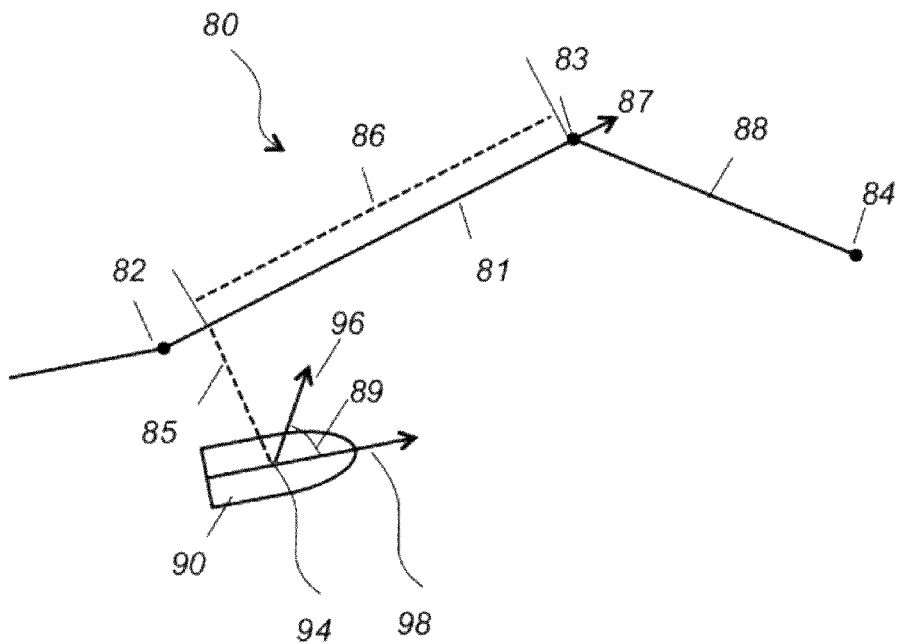
FIG. 4 is a schematic diagram of a ship guided via the pilot line based steering system of FIG. 3.
Figure 7A:
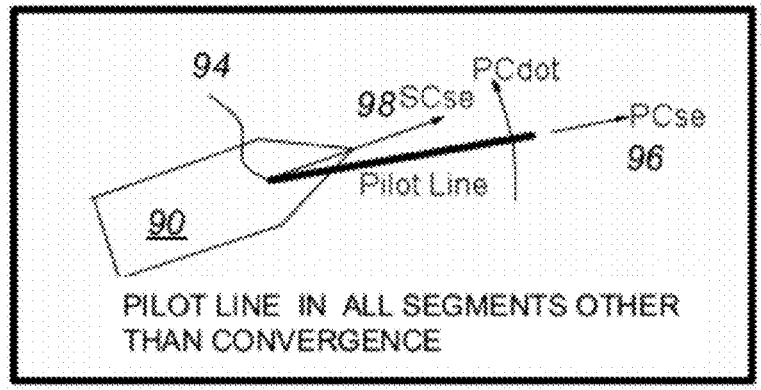
FIG. 7A is a schematic diagram of the pilot line in all segments other than convergence.
Figure 7B:
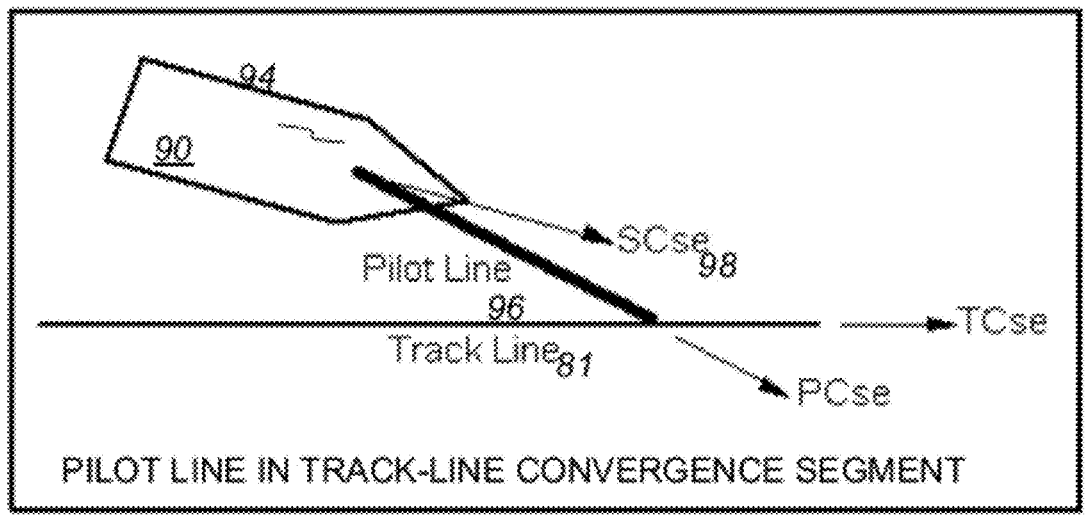
FIG. 7B is a schematic diagram of the pilot line in the convergence segment.

The steering system 60 of the present invention utilizes a "pilot-line" methodology for providing directional guidance of the ship. A "pilot-line" is a mathematical vector 96 that has its origin attached to a point 94 on the ship's center line 90 and points to a desired instantaneous direction, as shown in FIG. 4, FIG. 7A, and FIG. 7B. Referring to FIG. 3 and FIG. 4, for each of the periodic GPS readings, the offset 85 between the ship's location and the track line 81, the distance 86 on the track line 81 to reach the next waypoint 83, and the angular direction 87 of the desired track line 81 are determined by the navigation application 65. Based on the determined offset 85 and angular direction 87, the navigation application 65 computes the angular position ($P_c$)) 63 of the pilot line 96 and the angular turn rate 61 of the pilot line ($dP_c/dt$). As shown in FIG. 4 and FIG. 7A (settle segment), the pilot line 96 has its origin attached to the ship's turning point 94, and points to a desired instantaneous direction. As was mentioned above, the outputs of the navigation application 65 are the pilot line angular position ($P_c$) 63 and the pilot line angular turn rate ($dP_c/dt$) 61. These outputs are subsequently used as inputs for the autopilot application 134. The autopilot application 134 receives the pilot line angular position 63 (or pilot line course) ($P_c$) and the pilot line angular turn rate 61 (or pilot line turn rate) ($dP_c/dt$) inputs and calculates rudder steering commands 110 that steer the ship 90 so that the ship's velocity vector lines up with the pilot line vector 96. Between the periodic GPS readings, the computed offset 85, and distance 86 are updated according to the ship's motion sensors (dead reckoning). In other embodiments, a plurality of navigation applications is used, where each navigation application is designed to calculate specific maneuvers.

Figure 5:
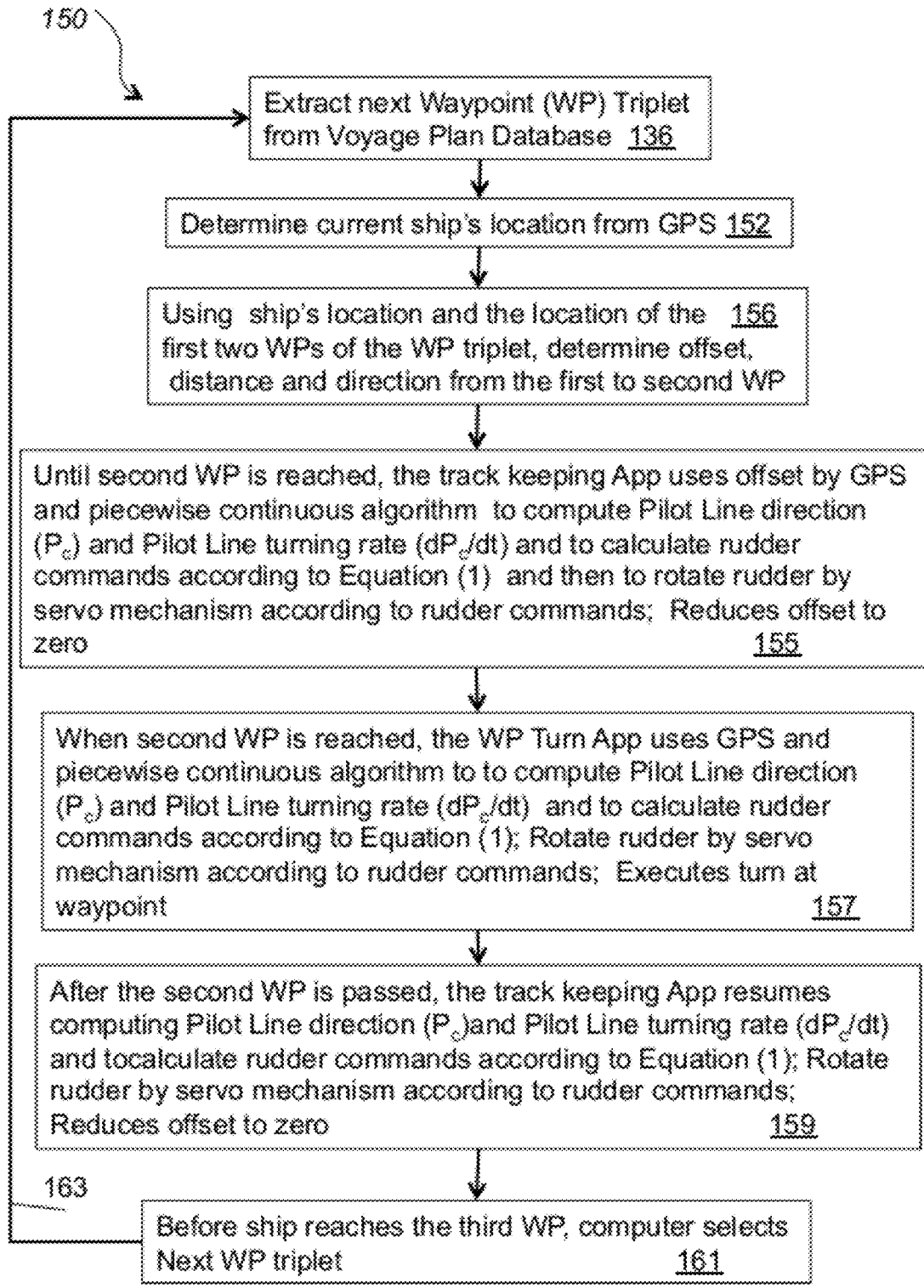
FIG. 5 is a flow diagram of the pilot line methodology for executing a voyage plan.

Referring to FIG. 5, the process flow diagram 150 of the "pilot-line" steering methodology includes the following steps. First, a waypoint triplet including points 82, 83, 84 is extracted from the voyage plan database 136 (151). The ship's current location 64 is obtained periodically from the GPS (152). In one example, the GPS reading provides ship's location every three minutes. Next, the offset 85, distance 86 and angular direction 87 of the ship's current location from the track line 81 are determined (156). Next, a track keeping application (track keeping App) uses the determined offset and a piecewise continuous navigation algorithm to compute the pilot line direction (Pc) and the pilot line turning rate ($dP_c/dt$) and then to calculate rudder commands according to equation 1, as will be described below (155). The servomechanism 30 rotates the rudder according to the calculated rudder commands and the ship's angular position is adjusted in order to reduce the offset to zero. This step is repeated until the second waypoint 83 is reached. When the second waypoint 83 is reached a waypoint turn application (WP Turn App) uses the GPS reading and the piecewise continuous navigation algorithm to compute pilot line direction (Pc) and pilot line turning rate ($dP_c/dt$) and then to calculate rudder commands according to equation 1. The servomechanism 30 rotates the rudder according to the calculated rudder commands and the ship executes a turn at the waypoint (157). After the second waypoint 83 is passed the track keeping application resumes computing pilot line direction (Pc) and pilot line turning rate ($dP_c/dt$) and then calculates rudder commands according to equation 1 (159). The servomechanism rotates the rudder according to the calculated rudder commands and the ship's angular position is adjusted in order to reduce the offset to zero. Before the ship reaches the third waypoint 84, the computer selects the next waypoint triplet (161) and the process repeats itself (163).

The rudder commands 110 are calculated based on the following equation:

$$\text{RudCmd} = K_{max}(P_c - S_c) + K_{vel}(dP_c/dt - dS_c/dt) \quad \text{Equation (1)}$$

Wherein:
RudCmd is the Rudder Command function
$P_c$ is the pilot-line angular position,
$S_c$ is the ship's angular position,
$dP_c/dt$ is the pilot-line angular turn rate,
$dS_c/dt$ is the ship's angular turn rate,
Kmax=MaxRudRate/MaxTurnRate, is the ratio of the maximum linear turning rate of the rudder (MaxRudRate) to the maximum allowable turning rate of the ship (MaxTurnRate). Kmax provides the rudder deflection per unit difference between the pilot line angular position and the ship's angular position.

Kvel is a constant given a value which causes the ship's rate response to a pilot-line rate input to be properly damped. Kvel provides the rudder deflection per unit difference between the pilot line angular rate and the ship angular turn rate.

Figure 6:
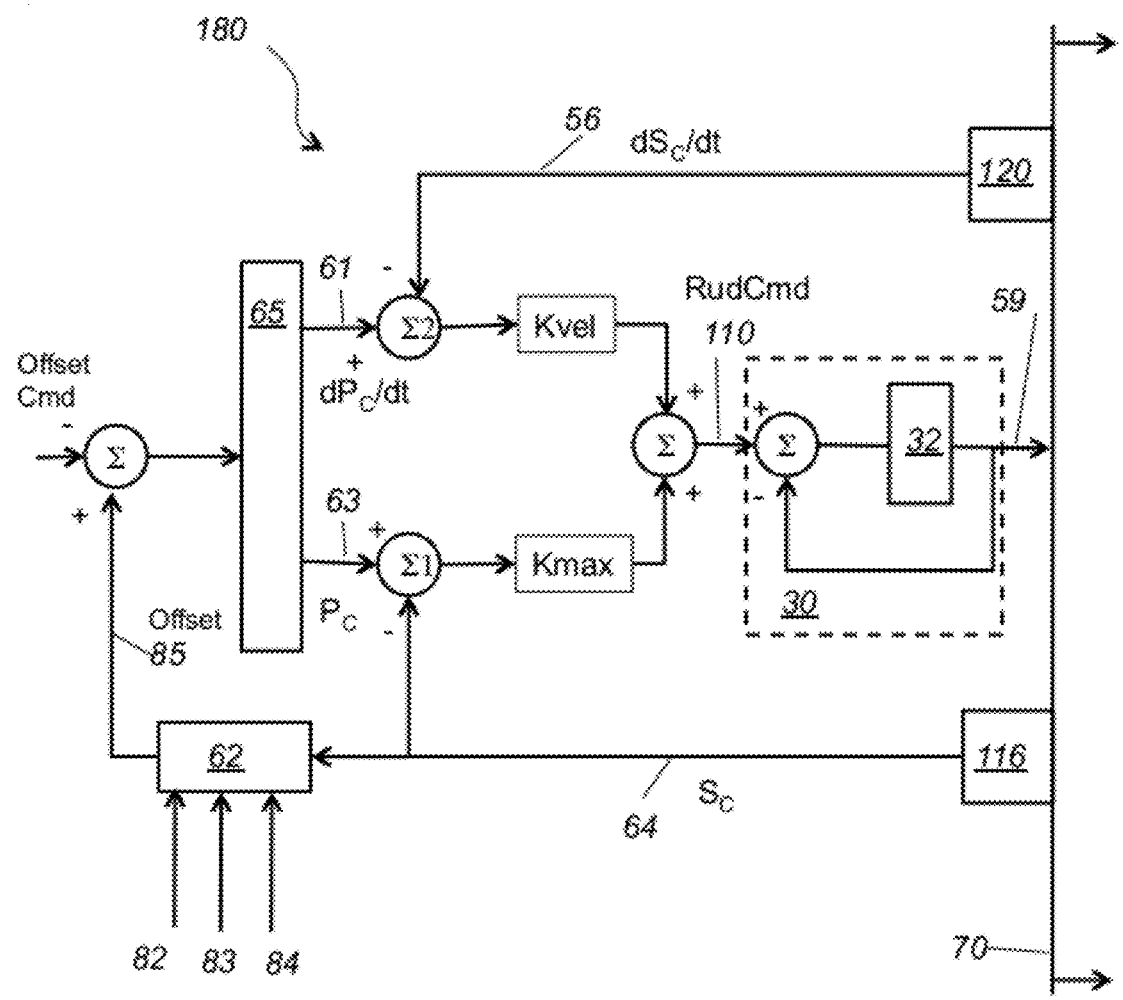
FIG. 6 is a block diagram of the pilot line steering system.

FIG. 6 depicts a block diagram 180, which includes the diagram of equation (1). The difference ($\Sigma 1$) between the pilot line course ($P_c$) 63 and the ship's course line ($S_c$) 64 is multiplied by the Kmax constant. Similarly, the difference ($\Sigma 2$) between the pilot line turning rate ($dP_c/dt$) 61 and the ship's turning rate $dS_c/dt$ 56 is multiplied by the Kvel constant. The sum ($\Sigma$) of the two differences ($\Sigma 1$) and ($\Sigma 2$) (partial rudder commands) results in the rudder command 110 according to which the servo-motor 32 in the rudder servomechanism 30 is directed. The ship responds to the rudder motion and takes a new position ($S_c'$) and turning rate ($dS_c/dt'$). This process repeats itself until the ship's position 98 is equal to the pilot line course ($P_c$) 63 and the ship's turning rate $dS_c/dt$ 56 is equal to the pilot line turning rate ($dP_c/dt$) 61. The ship's course line ($S_c$) 64 is provided by the ship angular position sensor 116 (i.e., a compass). The ship's turning rate $dS_c/dt$ 56 is provided by the ship turn rate sensor 120.

All ship maneuvers are accomplished with the ship's turn rate being equal to or less than the MaxTurnRate constant and with the rudder's turn rate being equal to or less than the MaxRudRate constant in order to avoid excessive heeling (tilting) of the ship or excessive rudder motion, respectively. In one example, MaxTurnRate is 15 degrees/minute, MaxRudRate is 3 degrees/second, the overall autopilot constant Kmax is 12, and Kvel is 2 degrees/(degree/min).

Equation (1) calculates steering commands so that the offset 85 between the current ship's course 98 and the desired ship's course along track line 81 is minimized, without any sudden rudder movements and with a rudder turn rate that remains below a set value of the maximum allowable rudder turn rate and with a ship's turn rate that remains below a set value of the maximum allowable ship turn rate. The pilot line turn rate outputs of the navigation application are restricted to values between zero and the MaxTurnRate value in either direction. The autopilot application responding to the pilot line parameters delivers continuous rudder commands whose rates in either direction have values between zero and the MaxRudRate value without non-linearities, sudden jumps or dead space. The resulting rudder action is smooth and minimal in amplitude.

Every maneuver executed by the rudder is made up of a series of functional segments. Each segment has pilot-line inputs, $P_c$ and $dP_c/dt$ and operates according to equation (1) to produce rudder commands continuously for the duration of that segment. The rudder command follows these inputs along with the ship's position and rate in accordance with equation (1) to bring the ship into alignment with the pilot line. This process defines a piecewise-continuous operation of the autopilot function (piecewise-continuous algorithm).

There are three types of functional segments: the settle (or rate) segment, the approach (or course) segment and the convergence (or offset) segment, corresponding to three feedback loops of the autopilot function, the settle (or rate) loop, the approach (or course) loop and the convergence (or offset) loop. The purpose of the settle segment is to establish a rate of turn. The purpose of the approach segment is to establish a course. The purpose of the convergence segment is to establish an offset from a track line, or more often, to reduce an offset to zero. Each segment has its own pilot line. In the settle segment shown in FIG. 4 and FIG. 7A, and in the approach segment, the pilot line 96 has its origin attached to the ship's turning point 94, and points to the desired instantaneous direction. In the settle and approach segments the direction of the pilot line is the parameter of significance. In the convergence segment, shown in FIG. 7B, the pilot line 96 has its origin attached to the ship's turning point 94, and its tip follows the desired instantaneous track line 81. Since the origin of the pilot line vector is fixed to the ship's turning point and its tip slides along the track line, the ship's forward motion cause rotation of the pilot line ($dP_c/dt$). Therefore, in the convergence segment, the direction and the length of the pilot line ($R_p$) are significant parameters. In one example, the "pilot-line" 96 has a length equal to the ship's length. In other examples, the pilot line has a length selected to be equal any length above a minimum value.

Each segment starts with a rate change, dPc/dt, which causes the pilot line course, $P_c$, to change or to stop changing. The end of each segment occurs when the maneuver is ready for the next segment. A new segment starts when the pilot-line position reaches a point in the maneuver requiring a new pilot line position or rate, or both. The ship may or may not have reached alignment with the pilot line at the time of transition from one segment to the next.

At the instant of transition from one segment to the next, the rudder command's response is in accordance with equation (2).

$$RudCmd(0+)-RudCmd(0-)=Kmax(Pc(0+)-Pc(0-))+ Kvel(dPc/dt(0+)-dPc/dt(0-)) \quad \text{Equation (2)}$$

Wherein
(0−) refers to the instant before the transition
(0+) refers to the instant after the transition According to equation (2), a change in dPc/dt will cause a large jump in RudCmd. For example, an autopilot function with Kvel=3 deg per deg/min and change in dPc/dt of 15 deg/min would cause RudCmd to jump 45 degrees. This large jump in RudCmd is clearly unacceptable. This large jump can be avoided if Pc simultaneously acquires a value in the opposite direction of exactly the right amount. If the right-hand side of equation (2) is zero at the instant of transition, the RudCmd, of course, will not change. For the right-hand side of equation (2) to be zero, Pc(0+) has, and will have for all transitions, the value according to equation (3) which is derived from equation (2).

$$Pc(0+)=Pc(0-)-Kvel/Kmax(dPc/dt(0+)-dPc/dt(0-)) \quad \text{Equation (3)}$$

From this initial value, Pc grows throughout the segment at the rate of dPc/dt. The pilot-line rate is restricted to a range of values from maximum turn rate in one direction to the maximum in the other direction, and because the RudCmd rate is Kmax times the pilot-line's rate, RudCmd rate can never exceed the maximum turning rate of the rudder (MaxRudRate).

The second term of equation (3) (i.e., Kvel/Kmax(dPc/dt(0+)−dPc/dt(0−))) can be considered a pilot line bias (Pcbias) that is deducted from pilot line Pc. The pilot line bias remains constant as long as dPc/dt remains constant. If dPc/dt changes within a segment, as it does occasionally, the bias is adjusted according to the following equation (4).

$$Pcbias_k = Pcbias_{k-1} + Kvel/Kmax(dPc/dt_k - dPc/dt_{k-1}) \quad \text{Equation (4)}$$

Wherein:
subscript k refers to the current computer iteration
subscript k−1 refers to the previous iteration Examples of segments with changing dPc/dt include the convergence segment in which dPc/dt reduces asymptotically to zero and the manual mode in which dPc/dt in the settle/rate segment is manually controlled by the wheel on the steering stand.

All maneuvers contain at least two segments, and some require more. For example, a simple course change of any size has two segments; one to build up the turning rate at the start of the turn, and the other to bring it down when the new course is reached. A course change at a waypoint has four segments; one to build up the turning rate, one to bring the turning rate down to zero on the approach line, one to build up and hold the turning rate throughout the turn and one to bring it down at the end of the turn. Track line keeping is accomplished by correcting any offset shown by the periodic GPS readings. Two or three segments are required for each offset correction.

As was mentioned above, the elements of the pilot line steering with which maneuvers are designed include, the settle segment, the approach segment, and the convergence to track line segment.

The settle segment is applied when the ship's course difference from the approach line direction is large. In this case, one end of the pilot line is attached at a point on the ship's centerline and the other end points away from the direction of the desired approach line and rotates toward it. The ship steers to keep itself aligned with the approach line until it reaches a point where convergence can start. The approach segment is applied when the offset is still too great to initiate convergence. In this segment the pilot line does not rotate and the ship aligns with the approach course. In the case where the convergence segment initiates rotation at the maximum allowable ship's turn rate is called the maximum approach course. The convergence to track line segment is applied when the ship's offset from the track line is small. In this case, one end of the pilot line is attached at a point on the ship's centerline and the other end lies on the track line and moves along as the ship moves forward. The ship steers to keep itself aligned with the pilot line and this action causes the offset course error and turn rate to simultaneously reduce to zero.

In cases where the ship's course difference from the track line is large, first a settle segment is applied, then an approach segment is applied and then a convergence segment is applied. In cases where the ship's course difference from the track line is small, first a settle segment is applied and then is followed by the convergence segment.

The pilot-line steering methodology is applied to both manual and automatic steering and is capable of performing any type of ship maneuvers including manual maneuvers and the Williamson maneuver, among others.

Applications of the "Pilot-Line" Steering Methodology

EXAMPLE 1

Track Line Keeping (Track Keeping App)

Figure 8:
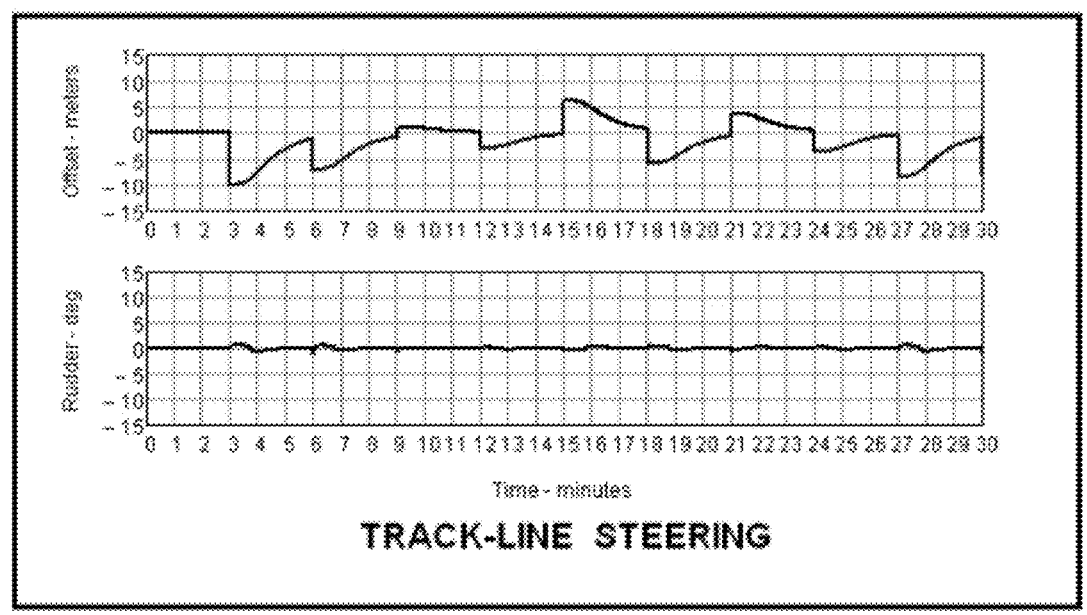
FIG. 8 depicts graphical representations of the offset and rudder commands versus time for the track line steering mode.
Figure 8A:
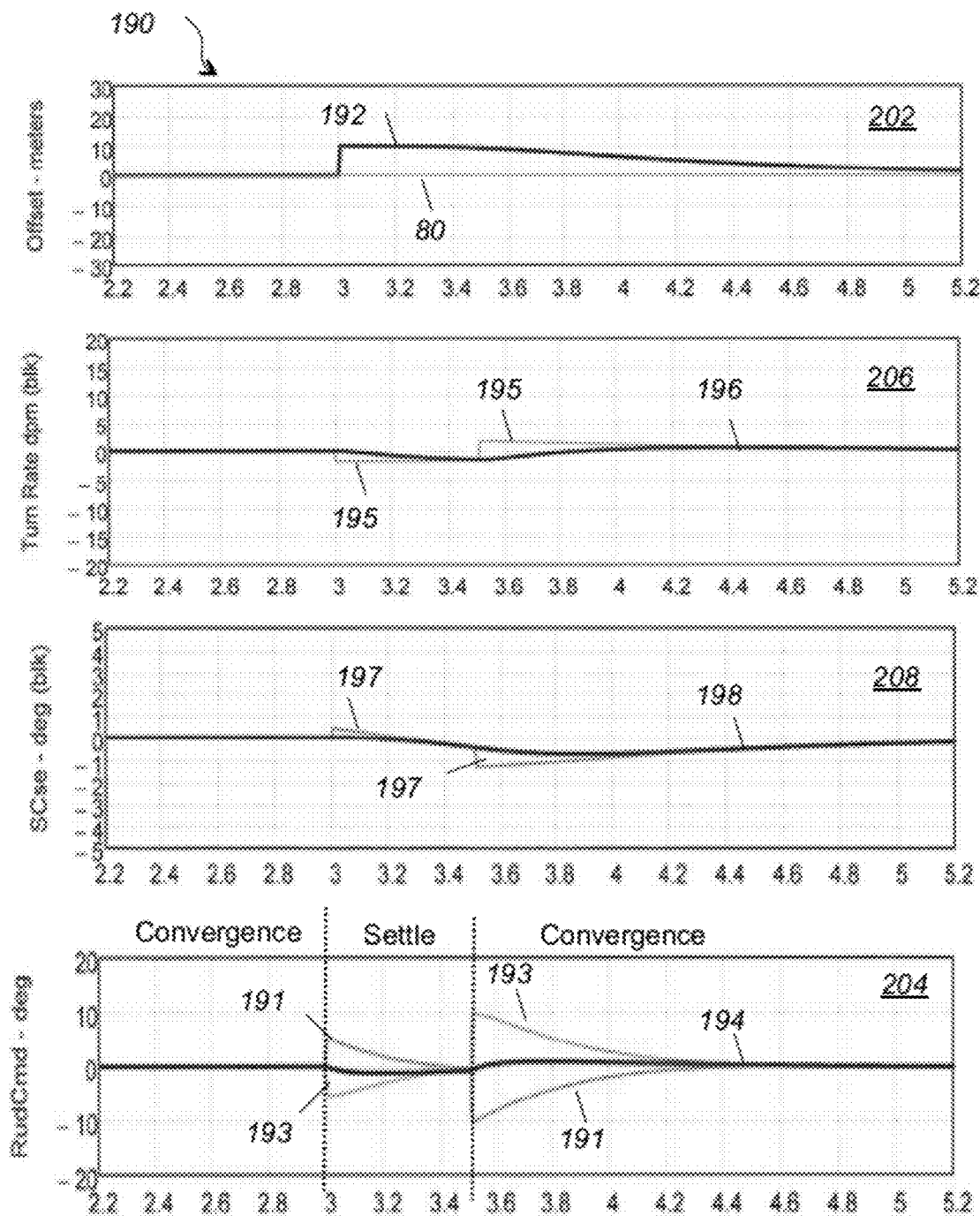
FIG. 8A depicts expanded graphical representations of the variables of the pilot line equation versus time for the track line steering mode.

Voyages of ships at sea are mostly track line keeping along track lines between waypoints with occasional turns at waypoints. For track line keeping, the navigation application of the pilot line based steering system uses the pilot line in the following way. The origin of the pilot line is attached to the ship's turning point, and the other end of the pilot line, i.e., the tip, slides along the selected track line, as shown in FIG. 7B. The length of the pilot line is fixed at a value of approximately the ship's length. At each of the periodic GPS readings the offset (if any) and the track-line direction are used to compute the pilot-line direction and turning rate of a new convergence segment, shown in FIG. 7B. To prevent any sudden rudder jump, the corresponding approach course is also computed. As the pilot-line direction in the old convergence segment immediately prior to the GPS reading is nearly the same as the track-line direction and different from the computed approach course, transition to the new convergence segment cannot occur. Before that can happen, the settle segment is activated to rotate its pilot line toward the computed approach course, as shown in FIG. 7A. When the direction of the pilot line of the settle segment becomes equal to the computed approach course, the transition to the new convergence segment takes place and the pilot line and the ship's course converge onto the track line bringing the offset to zero. In FIG. 8, the graph shows that these offset corrections are accomplished with slowly acting rudder movements of no more than about one degree. In FIG. 8A, the graph shows how the succession of functional segments accomplishes the smooth minimal rudder action for track lines of any length.

Figure 8B:
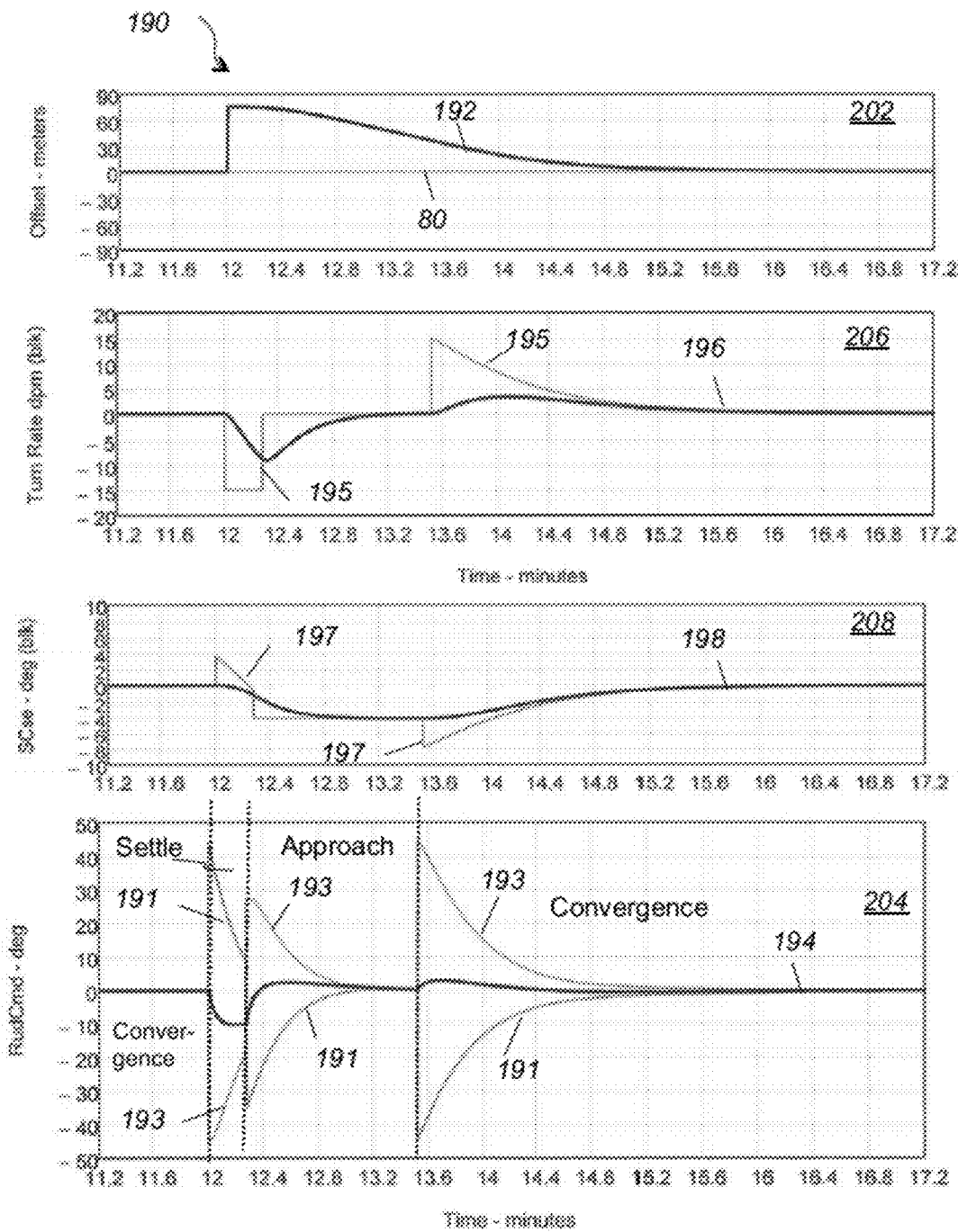
FIG. 8B depicts expanded graphical representations of the variables of the pilot line equation versus time in case of a large offset for the track line steering mode.

In rare instances an offset may be large enough so that the computed pilot-line turning rate is the maximum allowable for the new convergence segment, the computed approach course will also be the maximum allowable and both the settle segment and the approach segments will be successively activated before the transition to the new convergence segment can take place. In FIG. 8B, the graph shows that the correction for a large offset requires three segments. The duration of the approach segment will be larger than shown if the offset causing it is also larger than shown. The graph in FIG. 8 shows that rudder movements of less than one degree make these corrections except when the offset is large.

EXAMPLE 2

Turns at a Waypoint Application (WP Turn App)

As the ship following a track line in the track keeping mode approaches the waypoint, the Track-Keeping App. is automatically switched to the WP Turn App at a preselected point. Just prior to the time of the switching, the autopilot function may be in any one of the three segment types. Accordingly the ship may be offset from the track line in either direction and the pilot line direction and rate of turn in process of correcting the offset.

The first step in the WP Turn App is to compute the direction of the tangent line from the ship to the circumference of the turning circle at the waypoint which serves as the approach to the turn initiation point. The settle segment followed by the approach segment brings the pilot line direction to that of the tangent line. As the ship moves along the tangent line in the approach segment, the navigation function looks ahead to the next segment which is the settle (rate) segment. The point at which the line from the ship to the center of the turning circle intersects the circumference is the prospective location of the ship before and during the start up of the turn. The settle segment pilot-line direction is tangent to the circumference of the turning circle and it lags behind the direction of the active pilot line (approach segment).

As the ship continues to move along the tangent line, the prospective location of the ship (rate segment) moves along the circumference of the turning circle and its pilot-line direction will be behind and moving toward the active pilot-line direction in the approach segment. As the direction of the settle segment pilot line continues to move closer to the direction of the active pilot line the difference eventually becomes equal to the pilot-line bias (Pcbias) and transition to the settle segment occurs. The turning rate (MaxTurnRate by default) is applied and the turn starts without any rudder jump.

At the midpoint of the turn, the computer switches waypoints from the current to the next. When the settle segment pilot-line direction plus the pilot-line bias (Pcbias) becomes equal the direction of the new track line, transition to the convergence segment occurs and its pilot-line direction and the ship's direction will both converge onto the new track line. Also, at this transition, the WP Turn App is switched back to the Track-Keeping App.

Figure 9A:
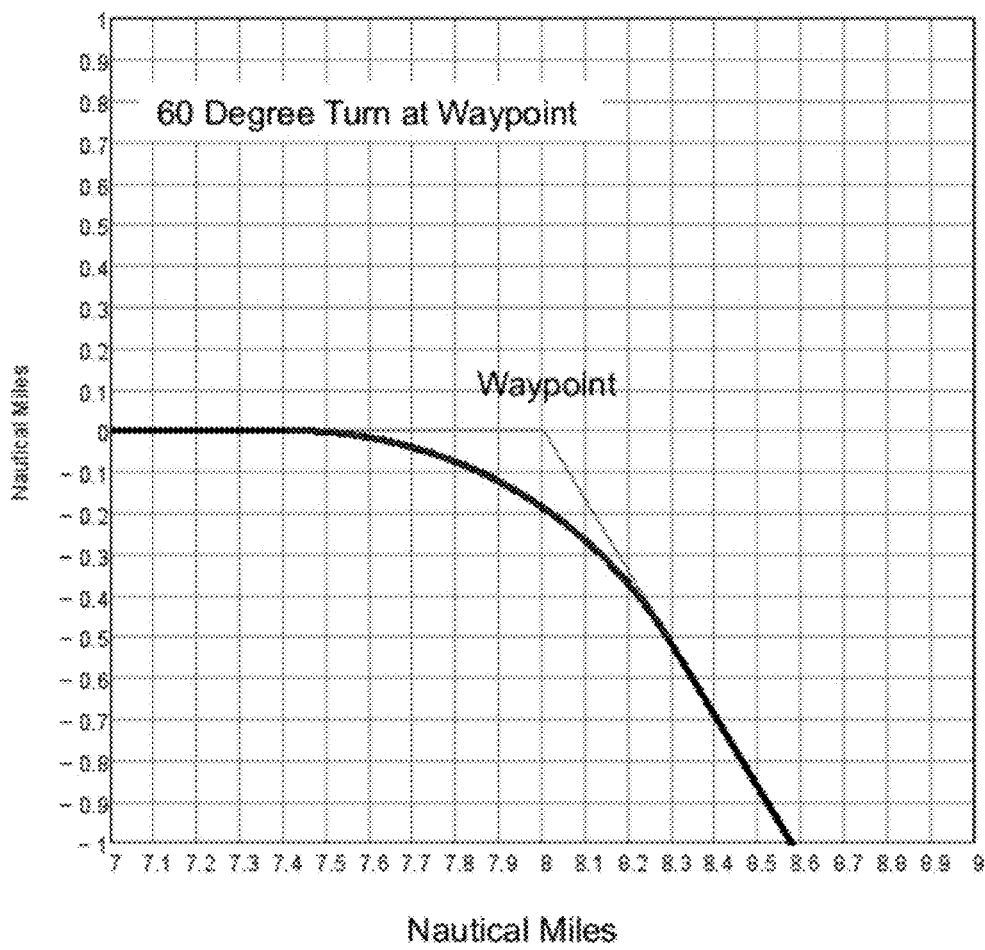
FIG. 9A is a plan view diagram of a 60-degree turn at a waypoint.
Figure 9B:
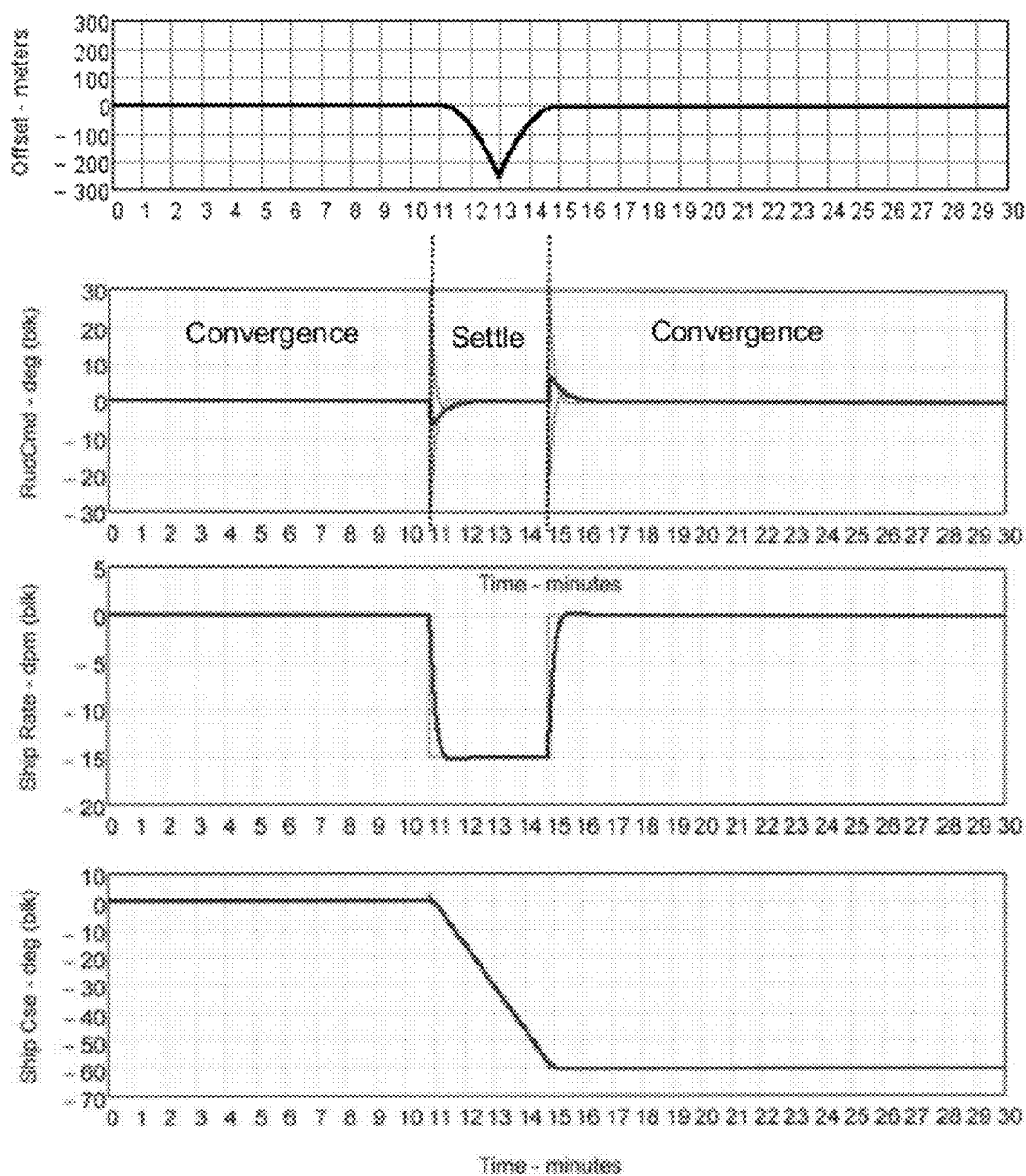
FIG. 9B depicts graphical representations of the offset and rudder commands versus time for the 60 degree turn of FIG. 9A.

FIG. 9A depicts schematically a 60 degree turn at a waypoint and FIG. 9B depicts graphical time plots of the calculated rudder commands and the corresponding ship's course line.

EXAMPLE 3

Manual Steering Mode

During a planned automatic voyage situations may occur that require manual intervention such as keeping clear of traffic or a change in plan. The manual steering mode operates by giving the helmsman control of the pilot line direction and rate. The helmsman directly controls the pilot line rate and the resulting pilot line position is displayed in display 104, thus enabling the helmsman to set a new course. The autopilot function continues to operate in the manual mode to keep bringing the ship into alignment with the pilot line. The resulting steering action is far easier than fully manual steering. Without leaving the manual mode, the helmsman can manually switch off the rate action to hold a course indefinitely. The pilot line system computer prevents the helmsman's action from exceeding the prescribed turning rate limits of the ship and its rudder.

Figure 10A:
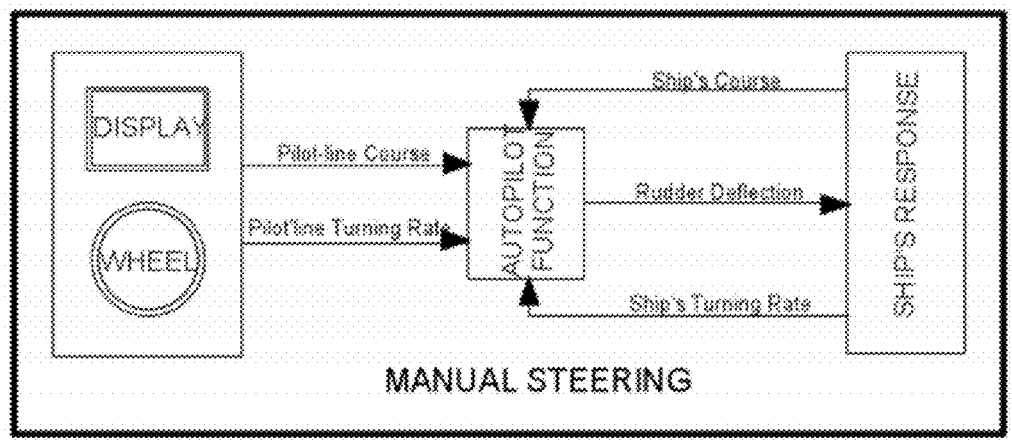
FIG. 10A is a schematic diagram of the manual steering mode within the pilot steering system.
Figure 10B:
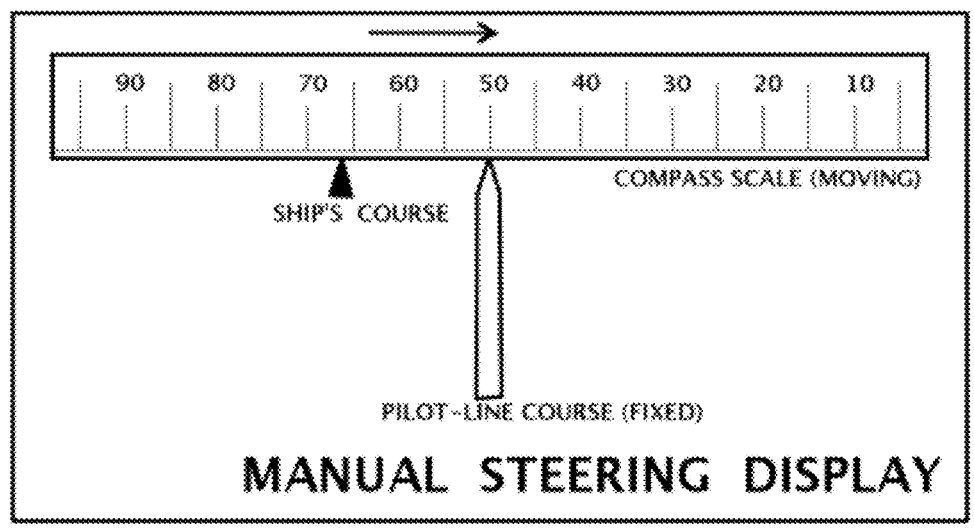
FIG. 10B depicts the display in the manual steering mode of FIG. 10A.

Before track line acquisition is initiated and after the final waypoint of the voyage is reached, the system operates in the manual steering mode. FIG. 10A depicts the pilot line system in the manual steering mode and FIG. 10B depicts the steering display in the manual steering mode.

EXAMPLE 4

Adaptive Steering

Figure 11:
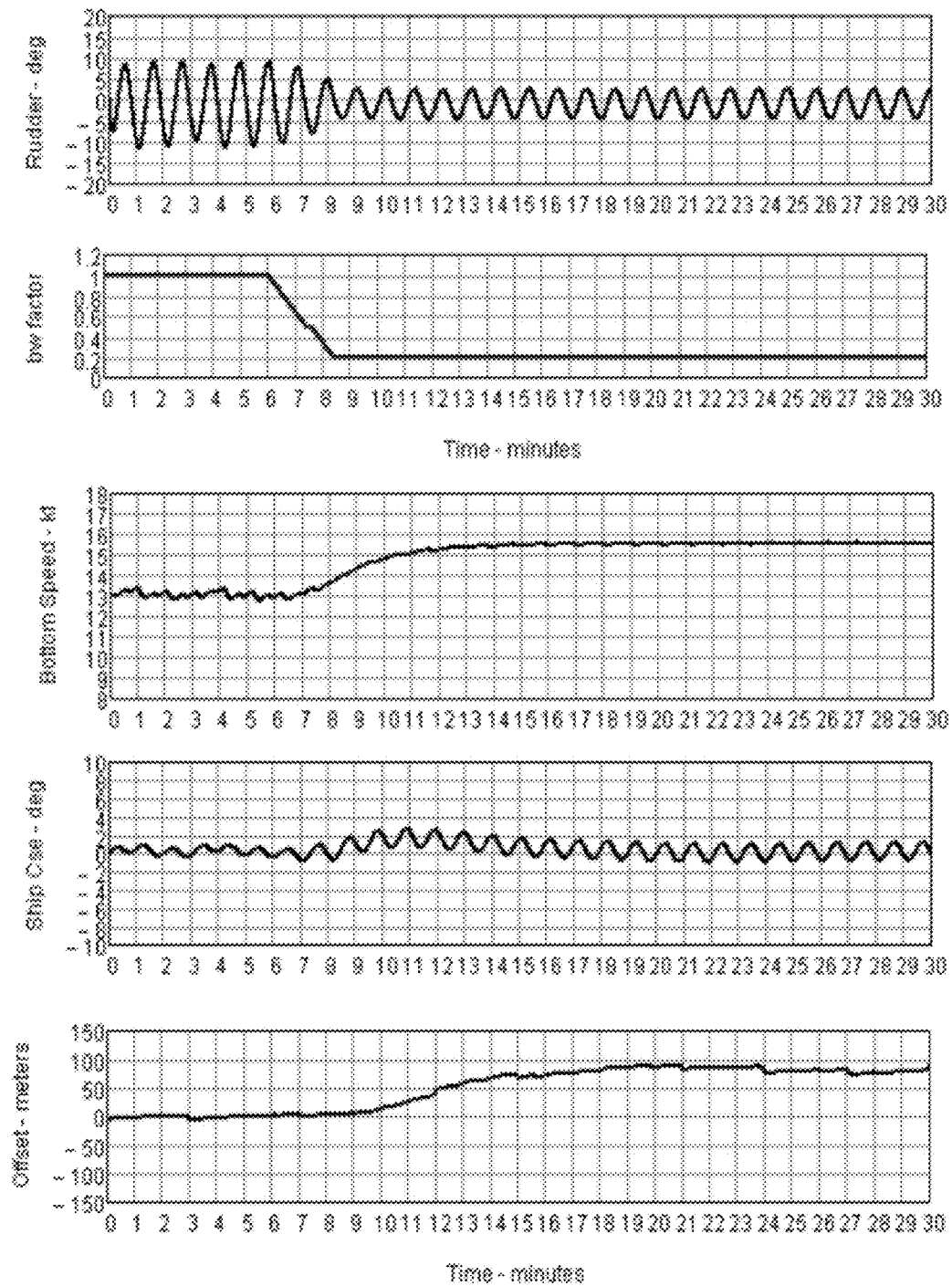
FIG. 11 depicts graphical representations of the variables of the pilot line equation versus time for the adaptive steering mode.

In rough seas, increased rudder action is required to keep the ship on course in the track-keeping mode. The resulting increase in induced drag of the rudder reduces the ship's forward speed. When the adaptive steering mode is entered, the pilot line system regains some, if not all, of that lost forward speed by reducing the bandwidth of the autopilot function to lessen the rudder response to the ship's yawing. The reduced bandwidth causes increased course error as the autopilot tries to hold course against persistent wind and waves. The course error causes the ship to drift away from the track line. The pilot line system computes the resulting offset caused by the drift to provide a signal to trim the rudder to reduce the course error to zero. FIG. 11 depicts graphically the adaptive response of the ship yawing +/−10 degrees.

EXAMPLE 5

Simulation of Track line keeping

In this simulation example, first the six first order hydrodynamic constants of a ship, its velocity (16 kt) and length (260 m) are defined.

Ship:=(0.184 1.435 1.255 0.253 4.000 0.442 16.kt 260 120)
Unstable hull

Next, the autopilot constants (MaxTurnRate, MaxRudRate, Kmax, Kvel) and the pilot line length are set.
MaxTurnRate:=15 deg/min
MaxRudRate:=3.0 deg/sec
Kmax:=MaxRudRate/MaxTurnRate=12
Kvel:=2 deg/deg/min
Rp=260 m (one ship's length)

All maneuvers are accomplished with the ship's turn rate being equal or less than the set MaxTurnRate and with the rudder rate being equal or less than the MaxRudRate. Kmax is the overall autopilot constant, Kvel is the rudder deflection per unit rate between pilot rate and ship rate. Rp is the pilot-line length and is set equal to one ship's length of 260 meters.

Next, the simulation parameters for track course (TCse=0), time between GPS readings (Tgps=3.0 min) and compass error (CMPerr=0) are also set. Disturbances including Wind (Wind:=2.0 deg), Wave and/or a Sinusoidal may also be considered. Next, the initial simulation parameter values are set for the ship's course ($Sc_0$), ship's turn rate ($dSc_0/dt$), pilot line course ($Pc_0$), pilot line turn rate ($dPc_0/dt$), distance along track line ($xs_0$), offset from track line ($ys_0$), calculated offset from track line ($ys_0$), maximum offset from which convergence can occur without exceeding the allowable turn rate (yee), ship's initial sideways velocity ($v_0$), and ship's turning rate ($r_0$). At each of the periodic GPS readings the offset between the ship's position and the track line and the direction of the track line are determined, and the appropriate values of the pilot line direction and turning rate are computed. The calculation includes settle, approach and convergence segments. In the settle segment the ship's position is lined up with the pilot line (Settle term in the simulation example below). In the approach segment, the pilot line at the end of this segment is set to an angle to approach the track line (Appch term in the simulation example below). Finally in the convergence segment the pilot line converges asymptotically with the track line (bPC term in the simulation example below). The calculated partial position rudder command (pRudCmd) 191, partial velocity rudder command (vRudCmd) 192, and total rudder command (RudCmd) 194 are shown in FIG. 8A, and FIG. 8B, as graphical time plots. The ship's turn rate 196 and the pilot line turn rate 195, as well as the ship's course 198 and the pilot line course 197 are also shown in FIG. 8A, and FIG. 8B, as graphical time plots.

$$\text{offset} := \begin{bmatrix} SC_0 \leftarrow TCse \\ SCdot_0 \leftarrow 0 \\ PC_0 \leftarrow TCse \\ PCdot_0 \leftarrow 0 \\ 0 \\ xs_0 \leftarrow 0 \\ ys_0 \leftarrow 0 \\ Ycmd_0 \leftarrow 0 \\ yecmax \leftarrow Rp \cdot \dfrac{MaxTurnRate}{\sqrt{\left(\dfrac{BotSpd}{Rp}\right)^2 + MaxTurnRate^2}} \\ r_0 \leftarrow 0 \\ v_0 \leftarrow 0 \\ \text{for } j \in 1 \ldots km \end{bmatrix}$$

-continued $$\begin{bmatrix} xs_j \leftarrow xs_{j-1} \\ ys_j \leftarrow ys_{j-1} \\ \text{if } \mod(j \cdot dt, Tgps) = 0 \\ \quad \begin{vmatrix} ys_j \leftarrow ys_j + [(md(2)-1) \cdot (10 \cdot m)] \\ sPC \leftarrow PC_{j-1} \end{vmatrix} \\ ys_j \leftarrow 50 \cdot m \text{ if } j \cdot dt = 12 \cdot \min \\ Ycmd_j \leftarrow Ycmd_{j-1} \\ Ycmd_j \leftarrow 0 \cdot m \text{ if } 13 \cdot \min - j \cdot dt = 0 \\ ye_j \leftarrow ys_j - Ycmd_j \\ \text{if } -yecmax < ye_j < yecmax \\ \quad \begin{vmatrix} cPC \leftarrow TCse - \operatorname{asin}\left(\dfrac{ye_j}{Rp}\right) \\ cPCdot \leftarrow \dfrac{BotSpd}{Rp} \cdot \dfrac{ye_j}{\sqrt{Rp^2 - (ye_j)^2}} \end{vmatrix} \\ \text{otherwise} \\ \quad \begin{vmatrix} cPC \leftarrow TCse - \\ \operatorname{asin}\left(\dfrac{yecmax - \operatorname{sign}(ye_j)}{Rp}\right) \\ cPCdot \leftarrow MaxTurnRate \cdot \operatorname{sign}(ye_j) \end{vmatrix} \\ cPCbias \leftarrow \dfrac{Kvel}{Kmax} \cdot cPCdot \\ aPC \leftarrow cPC + cPCbias \\ \text{if } (ye_j > 0 \wedge sPC < aPC) \vee (ye_j < 0 \wedge sPC > aPC) \\ \quad \text{if } -yecmax < ye_j < yecmax \\ \quad\quad \begin{vmatrix} PCdot_j \leftarrow cPCdot \\ PC_j \leftarrow cPC \end{vmatrix} \\ \quad \text{otherwise} \\ \quad\quad \begin{vmatrix} PCdot_j \leftarrow 0 \\ PC_j \leftarrow aPC \end{vmatrix} \end{bmatrix}$$

$$\begin{bmatrix} \text{otherwise} \\ \quad \begin{vmatrix} PCdot_j \leftarrow -cPCdot \\ PC_j \leftarrow sPC - \dfrac{Kvel}{Kmax} \cdot (-cPCdot - PCdot_{j-1} \cdot 0) \\ sPC \leftarrow sPC - cPCdot \cdot dt \end{vmatrix} \\ pRudCmd_j \leftarrow Kmax \cdot (PC_j - SC_{j-1}) \\ vRudCmd_j \leftarrow Kvel \cdot (PCdot_j - SCdot_{j-1}) \\ RudCmd_j \leftarrow pRudCmd_j + vRudCmd_j \\ D_j \leftarrow -RudCmd_j \\ v_j \leftarrow v_{j-1} + \dfrac{dtt}{Tv} \cdot (Fvd \cdot D_j - Fvr \cdot r_{j-1} - v_{j-1}) \\ r_j \leftarrow r_{j-1} - \left[\dfrac{dtt}{Tr} \cdot (Frd \cdot D_j + Fvr \cdot v_{j-1} + r_{j-1})\right] \\ SCdot_j \leftarrow r_j \cdot \dfrac{U}{shl} \\ SC_j \leftarrow SC_{j-1} + SCdot_j \cdot dt \\ ys_j \leftarrow ys_j + BotSpd \cdot \sin(SC_j - TCse) \cdot dt \\ xs_j \leftarrow xs_j + BotSpd \cdot \cos(SC_j - TCse) \cdot dt \\ \text{return } \begin{pmatrix} pRudCmd & RudCmd & vRudCmd & Ycmd \\ PC & PCdot & ye & ys & SC & SCdot \end{pmatrix} \end{bmatrix}$$

-continued $pRudcmd := offset_{0,0}$ $RudCmd := offset_{0,1}$ $vRudCmd := offset_{0,2}$ $Ycmd := offset_{0,3}$ $PCse := offset_{0,4}$ $PCdot := offset_{0,5}$ $ye := offset_{0,6}$ $\dot{y}e := offset_{0,7}$ $SCse := offset_{0,8}$ $SCdot := offset_{0,9}$ Referring to FIG. 8A, graph 202 depicts the offset 192 (ys) (in meters) of the ship from the track line 80 as a function of time (in minutes). The time scale represents a time interval of 3 minutes. Graph 204 depicts the calculated total rudder command 194 (RudCmd or RC) (in degrees) as a function of time (in minutes). In the same graph 204, the partial rudder commands 191 (position) and 192 (velocity) are also depicted. Partial rudder command 191 represents the position term ($K_{max}(P_c-S_c)$) in equation (1) and partial command 193 represents the turning rate term ($K_{vel}(dP_c/dt-dS_c/dt)$) in equation (1). Graph 206 depicts the ship's turning rate (dSc/dt) 196 (in degrees per minute) as a function of time. In the same graph the angular turning rate 195 of the pilot line (dPc/dt) is also plotted. Graph 208 depicts the ship's course (Sc) 198 (in degrees) as a function of time (in minutes). In the same graph the angular position 197 of the pilot line (Pc) is also plotted. As shown in graph 204, the graphs of the partial rudder commands 191 (position) and 193 (turning rate) are opposite to each other. This results in smooth rudder motion (no sudden jumps) and smooth ship motion. The angular rudder deflection is around 1 degree.

Several embodiments of the present invention have been described. Nevertheless, it will be understood that various modifications may be made without departing from the spirit and scope of the invention. Accordingly, other embodiments are within the scope of the following claims.

What is claimed is:

1. An autopilot system comprising:
   a navigation application for computing angular position and angular turn rate of a pilot line and wherein said pilot line provides directional guidance to a ship and comprises a vector having one end attached to a point on the ship and a second end pointing to a desired directed by a central processing unit;
   an autopilot steering application for calculating steering commands for a ship steering device wherein said autopilot steering application receives said computed pilot line angular position and angular turn rate and calculates angular position steering commands for said steering device by the central processing unit; and
   wherein said ship steering device steers the ship and is set according to the calculated steering commands to steer the ship so that the ship's velocity vector lines up with the pilot line.

2. The system of claim 1, wherein said autopilot steering application calculates said steering commands by taking into account the difference between the pilot line angular position and the ship's angular position and the difference between the pilot line angular turn rate and the ship's angular turn rate.

3. The system of claim 1 wherein said autopilot steering application calculates steering commands according to equation:

$$RudCmd = K_{max}(P_c-S_c) + K_{vel}(dP_c/dt-dS_c/dt),$$

Wherein RudCmd is the steering command;
   wherein $P_c$ is the pilot line angular position, and $S_c$ is the ship's angular position;
   wherein $dP_c/dt$ is the pilot line angular turn rate, and $dS_c/dt$ is the ship's angular turn rate;
   wherein Kmax is a constant having a value equal to the ratio of a maximum steering device angular turn rate to a maximum allowable ship angular turn rate; and
   wherein Kvel is a constant having a value that causes the ship's response to a pilot line angular turn rate input to be damped.

4. The system of claim 3, further comprising one or more motion sensors, and wherein said motion sensors provide input signals of ship's angular position and turning rate and wherein said autopilot steering application calculates said steering commands for the steering device based on said sensor input signals.

5. The system of claim 4, wherein ship maneuvers are accomplished with the ship's angular turn rate being equal or less than a set maximum ship angular turn rate value, and with the steering device angular turn rate being equal or less than a set maximum steering device angular turn rate value.

6. The system of claim 5, further comprising a computing system and wherein the computing system comprises a computing device, a database, said navigation application, and said autopilot steering application.

7. The system of claim 6, wherein said ship follows a voyage plan and said voyage plan comprises at least first and second waypoints connected via a track line and wherein said navigation application compares the ship's current position with said first and second waypoint positions and determines offset of the ship's current position from the track line, and angular direction of the track line and subsequently uses the determined offset of the ship's current position from the track line, and angular direction of the track line to compute pilot line angular position and angular turn rate.

8. The system of claim 7, wherein each navigation maneuver comprises one or more successive segments and wherein the navigation application computes pilot line angular position and pilot line angular turn rate for each segment and provides the computed pilot line angular positions and pilot line angular turn rates to the autopilot steering application for each successive segment.

9. The system of claim 8, wherein at a transition instant between two adjacent segments the pilot line angular position and angular turn rate are changed and the ship's position, ship's angular turn rate and the steering device's angular position do not change.

10. The system of claim 4, wherein said one or more motion sensors comprise one or more of ship's position sensor, a GPS, ship speed sensor, ship angular position sensor, ship angular turn rate sensor, steering device position sensor, compass, or speedlog.

11. The system of claim 6, wherein said database comprises voyage plan information, maximum ship angular turn rate and maximum steering device angular turn rate.

12. The system of claim 1 further comprising a command system and wherein said command system comprises a command unit and a display and wherein the command unit comprises one or more command buttons used to initiate specific maneuvers and wherein the display displays at least a portion of a selected voyage plan, the ship's direction and the pilot line.

13. The system of claim 8, wherein said pilot line angular position and angular turn rate are computed by taking further into account a bias of the pilot line angular position ($P_c$bias) associated with a change in the pilot line angular turn rate in any of said segments.

14. The system of claim 13 wherein at the instant of a transition from one segment to the next, the rudder command's response is calculated according to equation:

$$RudCmd(0+)-RudCmd(0-)=K_{max}(P_c(0+)-P_c(0-))+K_{vel}(dP_c/dt(0+)-dP_c/dt(0-))$$

wherein (0−) refers to the instant before the transition and (0+) refers to the instant after the transition.

15. The system of claim 14, wherein following a change in the pilot line angular turn rate the pilot line bias comprises a value equal to:

$$P_c\text{bias}=K_{vel}/K_{max}(dP_c/dt(0+)-dP_c/dt(0-))$$

and the pilot line is then calculated according to equation:

$$P_c(0+)=P_c(0-)-P_c\text{bias}.$$

16. A method for automatically steering a ship comprising:
providing a navigation application for computing angular position and angular turn rate of a pilot line and wherein said pilot line provides directional guidance to a ship and comprises a vector having one end attached to a point on the ship and a second end pointing to a desired directed by a central processing unit;
providing an autopilot steering application for calculating steering commands for a ship steering device wherein said autopilot steering application receives said computed pilot line angular position and angular turn rate and calculates angular position steering commands for said steering device by the central processing unit; and
wherein said ship steering device steers the ship and is set according to the calculated steering commands to steer the ship so that the ship's velocity vector lines up with the pilot line.

17. The method of claim 16, wherein said autopilot steering application calculates said steering commands by taking into account the difference between the pilot line angular position and the ship's angular position and the difference between the pilot line angular turn rate and the ship's angular turn rate.

18. The method of claim 16, wherein said autopilot steering application calculates steering commands according to equation:

$$RudCmd=K_{max}(P_c-S_c)+K_{vel}(dP_c/dt-dS_c/dt),$$

wherein RudCmd is the steering command;
wherein $P_c$ is the pilot line angular position, and $S_c$ is the ship's angular position;
wherein $dP_c/dt$ is the pilot line angular turn rate, and $dS_c/dt$ is the ship's angular turn rate;
wherein $K_{max}$ is a constant having a value equal to the ratio of a maximum steering device angular turn rate to a maximum allowable ship angular turn rate; and
wherein $K_{vel}$ is a constant having a value that causes the ship's response to a pilot line angular turn rate input to be damped.

19. The method of claim 18, further comprising receiving inputs from one or more motion sensors, wherein said motion sensors provide input signals of ship's angular position and turning rate and wherein said autopilot steering application calculates said steering commands for the steering device also based on said sensor input signals.

20. The method of claim 19, wherein ship maneuvers are accomplished with the ship's angular turn rate being equal or less than a set maximum ship angular turn rate value, and with the steering device angular turn rate being equal or less than a set maximum steering device angular turn rate value.

21. The method of claim 20, further comprising providing a computing system and wherein the computing system comprises a computing device, a database, said navigation application, and said autopilot steering application.

22. The method of claim 21, wherein said ship follows a voyage plan and said voyage plan comprises at least first and second waypoints connected via a track line and wherein said navigation application compares the ship's current position with said first and second waypoint positions and determines offset of the ship's current position from the track line, and angular direction of the track line and subsequently uses the determined offset of the ship's current position from the track line, and angular direction of the track line to compute pilot line angular position and angular turn rate.

23. The method of claim 22, wherein each navigation maneuver comprises one or more successive segments and wherein the navigation application computes pilot line angular position and pilot line angular turn rate for each segment and provides the computed pilot line angular positions and pilot line angular turn rates to the autopilot steering application for each successive segment.

24. The method of claim 23, wherein at a transition instant between two adjacent segments the pilot line angular position and angular turn rate are changed and the ship's position, ship's angular turn rate and the steering device's angular position do not change.

25. The method of claim 19, wherein said one or more motion sensors comprise one or more of ship's position sensor, a GPS, ship speed sensor, ship angular position sensor, ship angular turn rate sensor, steering device position sensor, compass, or speedlog.

26. The method of claim 21, wherein said database comprises voyage plan information, maximum ship angular turn rate and maximum steering device angular turn rate.

27. The method of claim 16, further comprising providing a command system and wherein said command system comprises a command unit and a display and wherein the command unit comprises one or more directional command buttons used to initiate specific maneuvers and wherein the display displays at least a portion of a selected voyage plan, the ship's direction and the pilot line angular direction and turn rate.

28. The method of claim 23, wherein said pilot line angular position and angular turn rate are computed by taking further into account a bias of the pilot line angular position ($P_c$bias) associated with a change in the pilot line angular turn rate in any of the segments.

29. The method of claim 28, wherein at an instant of a transition from one segment to the next, the rudder command's response is calculated according to equation:

$$RudCmd(0+)-RudCmd(0-)=K_{max}(P_c(0+)-P_c(0-))+K_{vel}(dP_c/dt(0+)-dP_c/dt(0-))$$

wherein (0−) refers to the instant before the transition and (0+) refers to the instant after the transition.

30. The method of claim 29, wherein following a change in the pilot line angular turn rate the bias of the pilot line comprises a value equal to:

$$P_c\text{bias}=K_{vel}/K_{max}(dP_c/dt(0+)-dP_c/dt(0-))$$

and the pilot line is then calculated according to equation:

$$P_c(0+)=P_c(0-)-P_c\text{bias}.$$

31. A method for automatically steering a ship comprising:
selecting a voyage plan by a central processing unit, wherein said voyage plan comprises at least first and second waypoints connected by a track line;

receiving ship's current position from a position sensor;

comparing ship's current position relative to said waypoints, and if there is an offset from the track line, computing angular position and angular turn rate of a pilot line for reducing said offset to zero and wherein said pilot line provides directional guidance to the ship by the central processing unit;

calculating ship steering commands by taking into account the difference between the pilot line angular position and the ship's angular position and the difference between the pilot line angular turn rate and the ship's angular turn rate; and setting ship's steering device angular position according to the calculated steering commands, thereby adjusting ship's angular position so that its velocity vector lines up with the pilot line.

32. The method of claim 31, wherein said steering commands are calculated according to equation:

$$RudCmd = K_{max}(P_c - S_c) + K_{vel}(dP_c/dt - dS_c/dt),$$

wherein RudCmd is the steering command;

wherein $P_c$ is the pilot line angular position, and $S_c$ is the ship's angular position;

wherein $dP_c/dt$ is the pilot line angular turn rate, and $dS_c/dt$ is the ship's angular turn rate;

wherein Kmax is a constant having a value equal to the ratio of a maximum steering device angular turn rate to a maximum allowable ship angular turn rate; and wherein Kvel is a constant having a value that causes the ship's response to a pilot line angular turn rate input to be damped.

33. The method of claim 32, further comprising introducing a bias in the pilot line angular position following a change in the pilot line angular turn rate.

34. The method of claim 33, wherein each navigation maneuver comprises one or more successive segments and wherein at an instant of a transition from one segment to the next, the rudder command's response is calculated according to equation:

$$RudCmd(0+) - RudCmd(0-) = K_{max}(P_c(0+) - P_c(0-)) + K_{vel}(dP_c/dt(0+) - dP_c/dt(0-))$$

wherein (0−) refers to the instant before the transition and (0+) refers to the instant after the transition.

35. The method of claim 34, wherein following a change in the pilot line angular turn rate the bias of the pilot line comprises a value equal to:

$$P_c\text{bias} = K_{vel}/K_{max}(dP_c/dt(0+) - dP_c/dt(0-))$$

and the pilot line is then calculated according to equation:

$$P_c(0+) = P_c(0-) - P_c\text{bias}.$$

36. The method of claim 31, wherein said calculating of the ship steering commands comprises one or more of a settle segment, an approach segment, or a convergence segment.

37. The method of claim 36, wherein in said settle segment said pilot line initially points away from an approach line and then rotates toward the approach line.

38. The method of claim 36, wherein in said approach segment the pilot line approaches the desired track line at a constant angle.

39. The method of claim 36, wherein in said convergence segment said pilot line's tip touches and slides along said track line causing the ship to converge asymptotically with the desired track line.

* * * * *